(12) United States Patent
Moudgill (10) Patent No.: US 9,146,708 B2
(45) Date of Patent: Sep. 29, 2015

(54) IMPLEMENTATION OF ARBITRARY GALOIS FIELD ARITHMETIC ON A PROGRAMMABLE PROCESSOR

(75) Inventor: Mayan Moudgill, White Plains, NY (US)

(73) Assignee: QUALCOMM Incorporated, San Diego, CA (US)

( * ) Notice: Subject to any disclaimer, the term of this patent is extended or adjusted under 35 U.S.C. 154(b) by 1038 days.

(21) Appl. No.: 12/991,877

(22) PCT Filed: May 7, 2009

(86) PCT No.: PCT/US2009/043179
§ 371 (c)(1),
(2), (4) Date: Mar. 10, 2011

(87) PCT Pub. No.: WO2009/140142
PCT Pub. Date: Nov. 19, 2009

(65) Prior Publication Data
US 2011/0153701 A1 Jun. 23, 2011

Related U.S. Application Data

(60) Provisional application No. 61/052,482, filed on May 12, 2008.

(51) Int. Cl.
*G06F 7/72* (2006.01)
*G06F 9/30* (2006.01)

(52) U.S. Cl.
CPC .............. *G06F 7/724* (2013.01); *G06F 7/722* (2013.01); *G06F 9/3001* (2013.01)

(58) Field of Classification Search
CPC ............ G06F 7/72; G06F 7/722; G06F 7/727
USPC .......................................... 708/620, 491, 492
See application file for complete search history.

(56) References Cited

U.S. PATENT DOCUMENTS 4,800,515 A * 1/1989 Hori et al. ..................... 708/492
5,396,502 A * 3/1995 Owsley et al. ................. 714/784

(Continued)

FOREIGN PATENT DOCUMENTS

CN 1589429 A 3/2005
JP 11-346157 12/1999

(Continued)

OTHER PUBLICATIONS

Moudgill et al., Jan. 2009, Galois filed instructions in the sandblster 2.0 architecture, International Journal of Deigial Multimedia Broadcasting, vol. 2009, 5 pp.

(Continued)

*Primary Examiner* — Chuong D Ngo
(74) *Attorney, Agent, or Firm* — Knobbe Martens, Olson & Bear LLP (57) ABSTRACT

A method for a Galois Field multiply includes executing first and second instructions. The first instruction includes receiving a first input, such as a first variable, receiving a second input, such as a second variable, performing a polynomial multiplication over $GF(2^m)$, using the first and second inputs, and producing a product. The second instruction includes receiving a third input, which may be the product from the first instruction, receiving a fourth input, which is a predetermined generator polynomial to operate upon the product, receiving a fifth input, which is a length of the predetermined generator polynomial, to limit operation of the predetermined generator polynomial upon the product, and computing, via the predetermined generator polynomial limited by the length, a modulus of the product with respect to a divisor. A hardware block is also described.

7 Claims, 5 Drawing Sheets

(56) References Cited

U.S. PATENT DOCUMENTS

| | | | |
|---|---|---|---|
| 5,768,168 A | 6/1998 | Im | |
| 6,760,742 B1* | 7/2004 | Hoyle | 708/492 |
| 6,766,345 B2 | 7/2004 | Stein et al. | |
| 2004/0177105 A1* | 9/2004 | Satoh et al. | 708/620 |
| 2006/0095495 A1* | 5/2006 | Choi et al. | 708/620 |
| 2006/0106910 A1 | 5/2006 | An | |
| 2006/0123325 A1 | 6/2006 | Wilson et al. | |
| 2012/0226731 A1* | 9/2012 | Gashkov et al. | 708/620 |

FOREIGN PATENT DOCUMENTS

| | | |
|---|---|---|
| JP | 2001-194996 | 7/2001 |
| JP | 2007514371 A | 5/2007 |
| WO | WO-03048918 A1 | 6/2003 |
| WO | WO 2005/062472 | 7/2005 |

OTHER PUBLICATIONS

Fiskiran et al., Sep. 27, 2004, Evaluating instruction set extensions for fast arithmetic on binary finite fields, Proceedings of the 15th IEEE International Conference on Application-Specific Systems, Architectures and Processors, pp. 125-136.
Jachimiec et al., May 1, 2007, Acceleration of finite field arithmetic algorithms in embedded processing platforms utilizing instruction set extensions, IEEE EIT 2007 Proceedings, vol. 2009, pp. 135-139.
Office Action dated Dec. 20, 2012 in Chinese patent application No. 200980116999.3.
Extended European Search Report dated Dec. 10, 2012 in application No. 09747227.8.
First Office Action dated Nov. 27, 2012 in Japanese patent application No. 2011-509567.
Kobayashi K et al., "A Combined Circuit for Multiplication and Inversion in GF($2^\lambda M$) Based on the Extended Euclid's Algorithm", Technical report of the Institute of Electronics, Information and Communication Engineers, Mar. 2, 2007, vol. 106, No. 549, pp. 13-18, ICD2006-233.
Meher P, "Systolic Formulation for Low-Complexity Serial-Parallel Implementation of Unified Finite Field Multiplication over GF($2\lambda m$),Application-specific Systems", Architectures and Processors, 2007, ASAP. IEEE International Conf. on , Jul. 11, 2007, pp. 134-139.
Namba R et al., "A Reconfigurable Dual-Field Multiplier for GF(P) and GF($2\lambda n$)", Technical report of Institute of Electronics, Information and Communication Engineers, Nov. 1, 2004, vol. 104, No. 421, pp. 7-12, OIS2004-46.
Okita S, "A Study on Reed-Solomon Encoding/Decoding Method for Plural Codes Existing Difference in Field Generation Polynomials", Proceedings of the Institute of Electronics, Information and Communication Engineers General Conference 1997; base/boundary, Mar. 6, 1997, p. 439, SA-5-2.
Berlecamp, May 1996, Bounded distance+1 soft decision Reed-Solomon decoding, IEEE Trans. Inform. Theory, 42:704-720.
Forney, Apr. 1996, Generalized Minimum Distance Decoding, IEEE Trans. Inform Theory, IT-12:125-131.
Mamidi, S., et al., "Instruction Set Extensions for Software Defined Radio on a Multithreaded Processor," CASES05, Sep. 24-27, 2005, San Francisco, California, USA [retrieved Nov. 8, 2010] Retrieved from the Internet. <URL: http://flossner.org/john/papers/2005_09_caes_mamidi.pdf>.
Mamidi et al., May 25, 2005, Instruction set extensions for Reed-Solomon encoding and decoding, Proceedings of the 16th International Conference on Application-Specific Systems, Architecture and Processors, 6 pp.
ISR and WO dated Jun. 24, 2009 in PCT/US09/43179.
IPRP dated Nov. 17, 2010 in PCT/US09/43179.

* cited by examiner

IMPLEMENTATION OF ARBITRARY GALOIS FIELD ARITHMETIC ON A PROGRAMMABLE PROCESSOR

CROSS-REFERENCE TO RELATED APPLICATIONS

The present application is the U.S. National Phase of International Application PCT/US2009/043179, filed May 7, 2009, which claims priority benefit under 35 U.S.C. §119(e) to U.S. Provisional Patent Application Ser. No. 61/052,482, filed on May 12, 2008, the contents of which are incorporated herein by reference.

FIELD OF THE INVENTION

The invention concerns implementation of Galois Field Arithmetic in $GF(2^m)$, where both the length, m, and the generator polynomial, p(x), may be specified by the user. To accomplish this, two instructions, (1) a gfmul instruction and (2) a gfnorm instruction, are introduced that, together, implement a Galois Field Multiply.

DESCRIPTION OF THE RELATED ART

Galois Field Arithmetic finds uses in many applications, including coding theory and encryption.

As may be appreciated by those skilled in the art, examples within the domain of coding theory include the well-known Reed-Solomon ("RS") error-correcting codes.

A RS error-correcting code typically is denoted as RS(n,k).

In one example, the RS code may operate with m-bit symbols. In such a code, the encoder groups k*m bits into a data-word of k data-symbols, where each symbol has m bits. The encoder then computes n-k additional parity symbols (also of m bits each) to form a code word of n*m bits, which is referred to herein as a "n symbol" code word. The maximum size of n is $2^m-1$.

In general, a RS code is able to correct any (n-k)/2 erroneous symbols.

A popular example of a RS code is the RS(255,223). The RS(255,223) uses 8 bit symbols, adds 32 parity bytes to a data block of 223 bytes, and corrects any erroneous 16 bytes in the resulting 255 byte code word. Since this particular RS code should be known to those skilled in the art, further elaboration is not provided herein.

The parity symbols are computed using the following three-part approach, which is discussed in the paragraphs that follow.

First, the k m-bit symbols are taken to be the coefficients of a degree k−1 polynomial over the Galois Field $GF(2^m)$. For purposes herein, the function is called "d(x)". Thus, if the symbols to be transmitted are $d_0 \ldots d_{k-1}$, the polynomial is may written according to equation (1):

$$d(x)=d_0+d_1x+ \ldots +d_{k-1}x^{k-1} \qquad \text{eq (1)}$$

Second, for a given RS code, a generator polynomial is selected. The generator polynomial may be represented by "g(x)", with a degree 2m−1. The generator polynomial may, therefore, be represented by equation (2):

$$g(x)=(x+a)(x+a^2) \ldots (x+a^{n-k}) \qquad \text{eq (2)}$$

In equation (2), "a" is a special value in $GF(2^m)$, called a "primitive element", as should be recognized by those of ordinary skill in the art.

Third, the parity symbols are computed by solving a parity equation, which may be expressed as in equation (3):

$$p(x)=d(x)*x^i \bmod g(x) \qquad \text{eq (3)}$$

In equation (3), all operations are executed over the field $GF(2^m)$.

As may be appreciated from the foregoing, addition and multiplication in Galois Fields of various sizes form the basis of Reed-Solomon encoding. Addition and multiplication also form the basis of the various RS decoding algorithms, such as the Berlekamp algorithm (E. Berlecamp, "Bounded distance+1 soft decision Reed-Solomon decoding", IEEE Trans. Inform. Theory., Vol. 42, pp. 704-720, May, 1996) and the Formey algorithm (G. D. Formey, "Generalized Minimum Distance Decoding", IEEE Trans. Inform Theory, Vol. IT-12, pp. 125-131, April, 1996).

Since addition and multiplication are fundamental to implementations of Galois Field equations, rapidity in executing Galois Field addition and multiplication assists with improving processing time and increasing processing efficiency.

As may be appreciated by those skilled in the art, Galois Field addition is simple, typically being an XOR of two arguments. Galois Field multiplication, however, is more complex, requiring either specialized hardware or an approach requiring a lookup table.

As the foregoing emphasizes, increases in processing time and efficiency are desirable "commodities" in the area of Galois Field processing.

SUMMARY OF THE INVENTION

The invention, therefore, presents certain approaches to increase processing efficiency and decrease processing time.

The invention presents approaches that resolve at least some of the deficiencies noted with respect to the prior art.

Specifically, it is one aspect of the invention to provide a method for a Galois Field multiply that executes a first instruction followed by a second instruction. The first instruction may be a gmful instruction and the second instruction may be a gfnorm instruction.

Another aspect of the invention provides for three operations to be included in the first instruction and four operations to be provided in the second instruction. The three operations that are included in the first instruction include receiving a first input that includes a first variable, receiving a second instruction that includes a second variable, and performing a polynomial multiplication over $GF(2^m)$, using the first and second inputs. The four operations that are provided for the second instruction include receiving a third input, which is the product from the first instruction, receiving a fourth input, which is a predetermined generator polynomial to operate upon the product, receiving a fifth input, which is a length of the predetermined generator polynomial, to limit operation of the predetermined generator polynomial upon the product, and computing, via the predetermined generator polynomial limited by the length, a modulus of the product with respect to a divisor.

Still another aspect of the invention provides a hardware block that includes a gmful logic and a gfnorm logic. The gmful logic includes a first input and a second input. The gmful logic also includes a polynomial multiplier logic that is configured to multiply, over $GF(2^m)$, the first and second inputs and produce a product. The gfnorm logic includes a third input, which receives the product from the gmful logic, a fourth input to receive a predetermined generator polynomial that operates upon the product from the polynomial multiplier logic, a fifth input to receive a length of the predetermined generator polynomial that limits operation of the predetermined generator polynomial upon the product, and a computational logic to compute a modulus of the product with respect to a divisor via the predetermined generator polynomial limited by the length.

As should be appreciated by those skilled in the art, other aspects of the invention will be made apparent from the discussion and from the drawings that follow.

BRIEF DESCRIPTION OF THE DRAWINGS

The drawings appended hereto illustrate one or more embodiments of the invention, in which.

DESCRIPTION OF PREFERRED EMBODIMENT(S) OF THE INVENTION

The invention will now be described in connection with one or more embodiment(s). The invention, however, is not intended to be limited to the embodiments described herein. To the contrary, as the following discussion will make apparent, there are numerous variations and equivalents to the embodiments discussed that may be employed without departing from the scope and spirit of the invention. These variations and embodiments are intended to fall within the scope of the invention.

With respect to the invention, for purposes of executing a Galois Field multiply (also referred to as a multiplication, herein), four pieces of information typically are required: (1) a value of the variable referred to as "multiplicand 1", (2) a value of the variable referred to as "multiplicand 2", (3) a generator polynomial, $p(x)$, and (4) a length of the polynomial, $m$.

Of these four variables, the first three are generally available from a register, typically a source register. The length of the polynomial, $m$, which is the fourth variable, either may be encoded as part of the instruction or may be read from a register, typically an immediate register.

As should be apparent to those skilled in the art, most instruction set architectures are not capable of providing three source register instructions plus one immediate register instruction. In addition, as also should be appreciated by those skilled in the art, most instruction set architectures are not capable of providing four source register instructions. Instead, prior art instruction set architectures resort to dedicated special purpose registers to provide at least some of the information required.

The invention relies upon a simple approach to the complex set of variables that are manipulated for Galois Field algorithms. Specifically, for the invention, the Galois Field multiply is split into two separate instructions: (1) a gfmul instruction, and (2) a gfnorm instruction. The gfmul instructions performs the m-bit polynomial multiplication over GF(2), yielding a 2m−1 bit product. In a generic alternative variation, the gfmul instruction performs the m-bit polynomial multiplication over GF($2^m$). Accordingly, in the GF(2) example, $m=1$. The gfnorm instruction computes the modulus of a 2m−1 bit number with respect to a m+1 bit divisor.

With this split, the gfmul instruction has 2 inputs: (1) multiplicand 1, and (2) multiplicand 2. As should be apparent, the gfnorm instruction has 3 inputs: (1) the product, (2) the polynomial, $p(x)$, and (3) the length, $m$.

As should be immediately apparent, this split reduces the port/encoding requirements for the instruction set. However, it also tends to force the processor to issue two instructions for every GF multiply.

From a theoretical perspective, forcing the processor to issue two instructions for every GF multiply would not appear to provide any appreciable advantage over the prior art. However, in practice, the gfnorm instruction is issued much less frequently than the gfmul instruction. As a result, this split does offer advantages over the prior art. Specifically, it has been observed that GF multiplies are usually performed as part of a larger reduction. The following equation summarizes this observation:

$$z = a_0 \otimes b_0 \oplus \ldots \oplus a_n \otimes b_n$$

This equation may be rewritten according to the following:

$$z = (a_0 \times b_0) \% P \oplus \ldots \oplus (a_n \times b_n) \% P = (a_0 \times b_0 \oplus \ldots \oplus a_n \times b_n) \% P$$

Thus, it is possible to XOR the 2m−1 bit product of n gfmul instructions together and to execute a final modulus at the end. By executing the instructions according to this design, the modulus does not need to be executed at each step. This provides, in certain cases, a significant processing savings both in terms of processing time and power consumption.

Sharing Logic

As should be appreciated by those skilled in the art, in Galois Field Algorithms (as with other computations), a remainder may need to be calculated. The present invention takes into account certain patterns in remainder calculation that permit simplification of this calculation. The invention also capitalizes on other mathematical patterns, as detailed below.

To compute a remainder (also referred to as a remainder polynomial), a series of subtractions (i.e., XORs) of the divisor is performed, based on whether or not the leading bit of the current remainder is 1. To compute the product, a series of additions (i.e., XORs) of one of the multiplicands is performed, based on whether or not the corresponding bit of the other multiplicand is 1.

As an example, consider the multiplication of 101100 and 011011. If the multiplication is written out in long form, the multiplication appears as follows:

|          |   |
|----------|---|
| 101100   |   |
| 011011   |   |
| 000000   | 0 |
| 101100   | 1 |
| 101100   | 1 |
| 000000   | 0 |
| 101100   | 1 |
| 101100   | 1 |
| 01111010100 | |

It is noted that this multiplication has been written in an order opposite to the normal normal order. In the example, the multiplication has been written out starting from the left, not the right.

With this example in mind, an example of a computation of the modulus of 11001101110 by 1001001 is provided. Here, the division calculation is written as:

```
11001101110
  1001001                    1011111110
  1001001                      010110110
   0000000                      10110110
    1001001                       0100100
     0000000
      100100
```

These two calculations are presented in this fashion to point out the similarities in the matrices. As is immediately apparent, the numbers to the right are the partial sums.

With reference to the two computations detailed above, one difference lies in the fact that the division XORs produce a m+1 bit number, while the multiply XORs produce a m bit number. It is, however, possible to compensate for this difference. A generator polynomial has the property that the leading bit is always a "1". It is possible, therefore, to exploit this property of the generator polynomial. For example, it is contemplated to use m-bit XORs by the following algorithm: (1) if the leading bit of the partial sum is 1, then XOR the remaining bits with the lowest m bits of the remainder polynomial, and (2) zero the leading bit.

The major difference between the two computations is the selection of whether to execute the XOR or not. In the case of the multiply, the $i^{th}$ leftmost bit of the multiplicand is used. In the case of the remainder, the leftmost bit of the current remainder is used.

Left Adjust/Zero Fill

The invention contemplates a simplification of the computation. For purposes of the simplification, it is assumed that all numbers involved, including the multiplicands, products, and remainder polynomials, are stored in the most significant bits ("MSBs") of the registers. In addition, it is assumed that all unused bits in the register are zeroed. As a result, if the number 101101 is stored in a 16 bit register, the register contents become 1011__0100__0000__000. While this is not strictly necessary, it simplifies the logic required to compute the remainder, because it does not become necessary to execute any additional instructions (or perform any additional work) to identify the leading digit.

Since all numbers are zero padded, m is not required as an input to the gfmul operation. The gmful operation performs the maximum number of XOR steps, and since any bits between the true length of the polynomial and the maximum polynomial length supported by the hardware will be zero, the additional XOR steps will contribute 0 to the result.

For a gfnorm operation, we have to perform m−1 XOR steps to reduce a 2m−1 bit polynomial to an m bit polynomial.

Psuedo-Code

Code Segment #1, below, presents one embodiment of the pseudo-code contemplated to implement the unified gfnorm/gfmul instructions for maximum m of 8. It is assumed that the inputs to the gfmul instruction are a and b, with a result t, and that the inputs to the gfnorm instruction are a, b, and N, with a result t. Indicies are left-first (i.e., 0 is the MSB of the register).

```
                    Code Segment #1
  gfmul;                        gfnorm;
  a=a<<7;
  t=0;                          t=b;
  for(i=0;i<8;i++) {            for(i=0;i<8;i++) {
    if(b[i] == 1) {               if(t[0] == 1 && i<=N ) {
      t=(t<<1)^a;                   t=(t<<1)^a;
    }                             }
```

```
                  Code Segment #1
    else {                        else {
      t=t<<1;                       t=t<<1;
    }                             }
  }                             }
```

It should be evident that the underlying logic is the same, and only the controls are different.

Extension

The basic operation discussed above may be modified in several different ways. For example, operations that may be added to the basic example include: (1) a gfmac instruction, (2) a vector, and (3) a vector-reduction. A gfmac instruction is an operation with three inputs. The gfmac instruction computes the product of two of its inputs and XORs that product with the third input, thereby producing a result. A vector is a vector/SIMD processor. For a vector, it is straight-forward to add vector/SIMD equivalents of the gfmul/gfnorm/gfmac instructions and to perform multiples of these instructions in parallel. A vector-reduction is executed in a vector/SIMD processor with a reduction unit. Here, it is contemplated to add an operation that performs multiple gfmul operations in parallel and the XORs all the results together before writing the results to a scalar target, such as an accumulator.

The invention will now be described in connection with embodiments of a method and embodiments of a hardware block, both of which are encompassed hereby. In connection with this discussion, reference is made to FIGS. 1-5.

Figure 1:
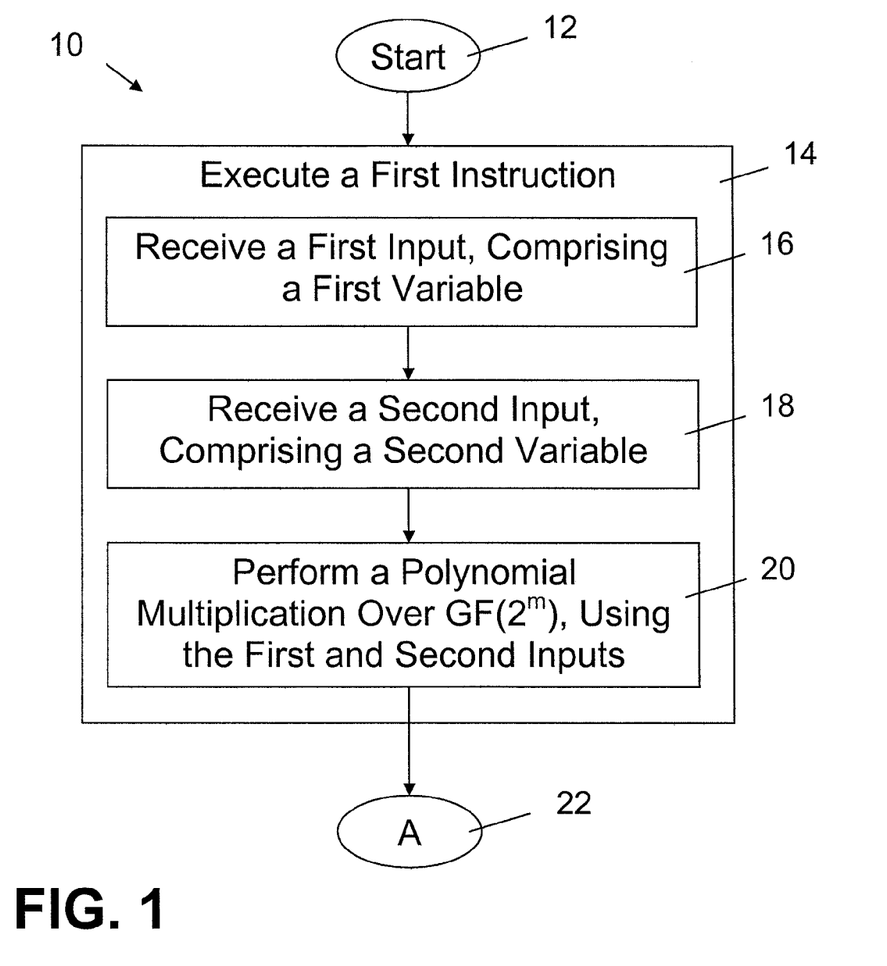
FIG. 1 is a flow diagram illustrating a first portion of one method contemplated by the invention.

One embodiment of the method of the invention contemplates a Galois Field multiply. The method, which is provided with reference numeral 10, is illustrated in FIGS. 1 and 2.

The method 10 begins at 12. Then, at 14, the method executes a first instruction. The execution of the first instruction 14 includes three operations, the first of which is receiving a first input at 16. The first input includes a first variable. Execution of the first instruction 14 also includes receiving a second input at 18. The second input may be a second variable. The execution of the first instruction additionally includes, at 20, performing a polynomial multiplication over $GF(2^m)$, using the first and second inputs. As a result of the execution of the polynomial at 20, the execution of the first instruction 14 produces a product. The product may become one of the inputs (i.e., the third input) for the execution of the second instruction at 24, which is discussed in connection with FIG. 2. FIG. 1 includes a transition block 22, which indicates that the method 10 continues in FIG. 2.

Figure 2:
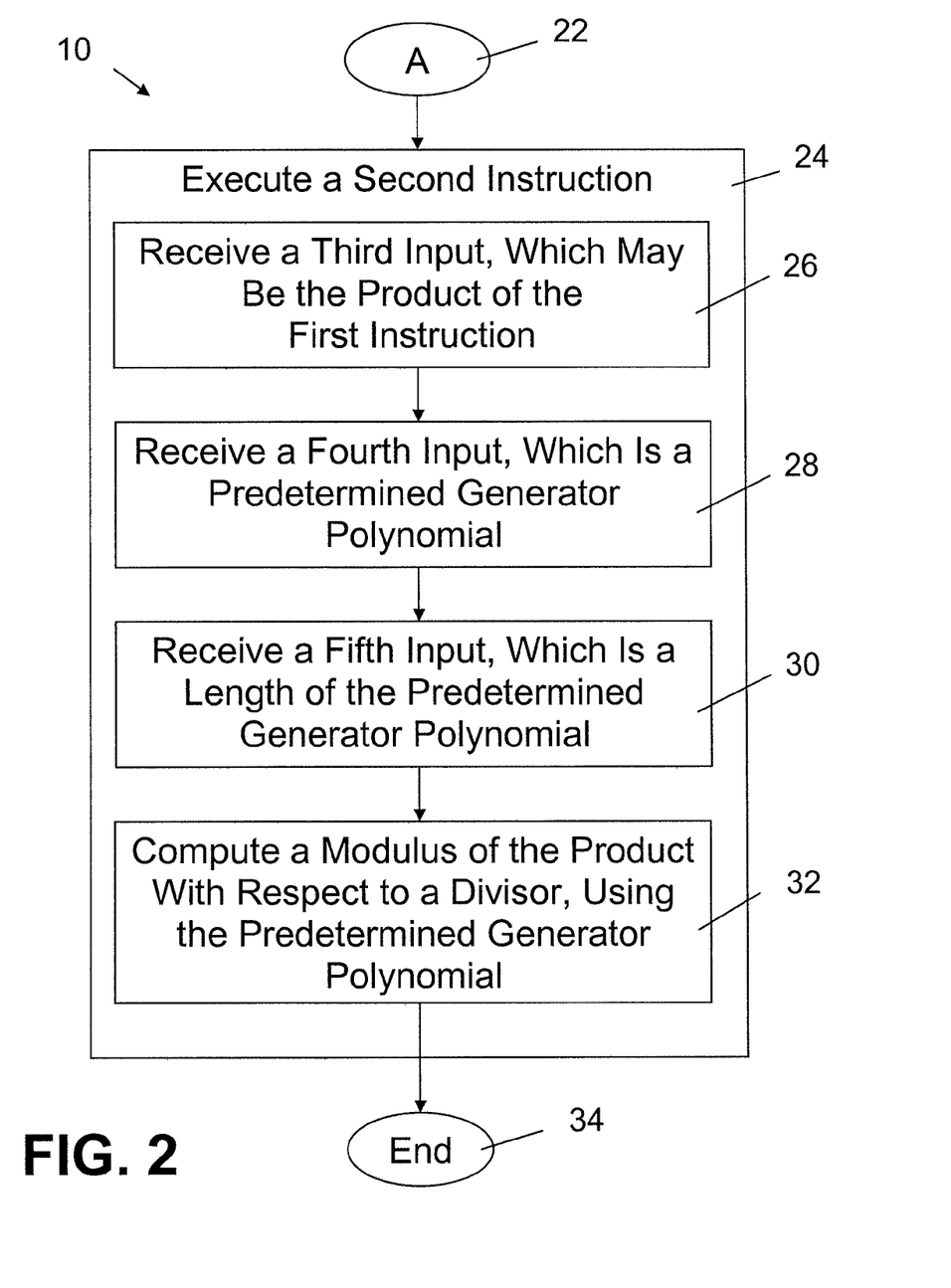
FIG. 2 is a flow diagram illustrating a second portion of the method illustrated in FIG. 1.

FIG. 2 details the remainder of the method 10. The method 10 continues to the execution of the second instruction at 24. As detailed in FIG. 2, there are four operations that make up the second instruction. The first of the four operations is at 26, where the method 10 receives a third input, which may be the product from the first instruction. At 28, the method 10 receives a fourth input, which is a predetermined generator polynomial to operate upon the product. At 30, the method 10 receives a fifth input, which is a length of the predetermined generator polynomial, to limit operation of the predetermined generator polynomial upon the product. At 32, the method 10 computes, via the predetermined generator polynomial limited by the length, a modulus of the product with respect to a divisor. The method 10 ends at 34.

In one contemplated variation on the method 10, the first instruction comprises a gfmul instruction and the second instruction comprises a gfnorm instruction.

In another contemplated variation on the method 10, the first variable comprises multiplicand 1 and the second variable comprises multiplicand 2.

It is also contemplated that the method 10 may be executed such that the length is a integer, m, and the product is 2m−1 bits in length. Consistent with this approach, the polynomial multiplication may be a m-bit multiplication. As such, the divisor may be m+1 bits in length. In one alternative embodiment, it is contemplated that the length is an integer, m−1.

As noted above, it is contemplated that the method 10 will execute the first instruction at 14 and the second instruction at 24 such that the second instruction is executed at a frequency less than that of the first instruction. This occurs when the result of multiple executions of step 14 are XOR-ed together before being sent, as a third input, to step 24.

In another contemplated embodiment of the invention, the method 10 may include an operation where a summation is made of the products of a predetermined number, n, of the first instructions. In this contemplated embodiment, a final modulus may be executed after summing the products of the predetermined number of the first instructions. As should be apparent, n is an integer in this embodiment.

As indicated above, it is contemplated that the method 10 may be executed such that values for the first and second inputs are stored in most significant bits in corresponding registers.

In addition, it is contemplated that the second instruction 24 may be modified by assessing if a leading bit of a current remainder equals 1. If the leading bit of the current remainder equals 1, the second instruction 24 then executes at least one subtraction of the divisor. As a result, the second instruction 24 may produce a remainder. Values for the remainder may be stored in the most significant bits in a corresponding register.

Alternatively, the method 10 may include a comparison between the first input and the second input. After the comparison, the method 10 may assess if a predetermined corresponding bit in one of the first or second inputs equals 1. If the predetermined corresponding bit in one of the first or second inputs equals 1, the method 10 may then execute at least one addition on at least one of the first or second inputs. As a result, the method 10 will produce a resulting product. Values for the resulting product may be stored in most significant bits in a corresponding register.

In one contemplated variation, all unused bits in the corresponding register may be zeroed. In another contemplated variation, at least one of the first variable, the second variable, the length, the product, and the divisor may contain data that is left-shifted.

It is also contemplate to modify the method 10 such that a leading bit of the predetermined generator polynomial is excluded from the fourth input, thereby creating a fourth variable with a length of m bits.

Figure 3:
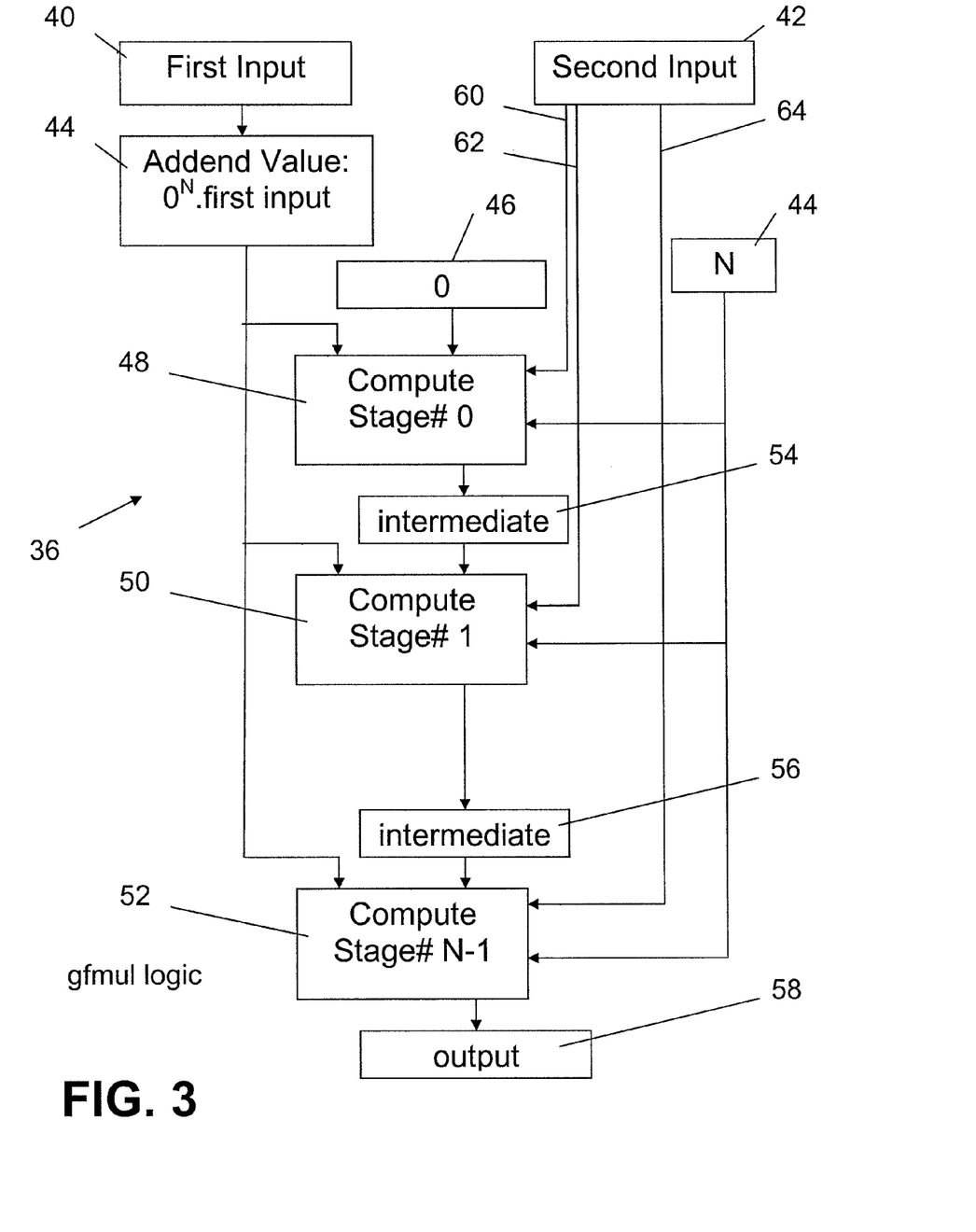
FIG. 3 is a block diagram providing one contemplated logic for the gmful instruction.
Figure 4:
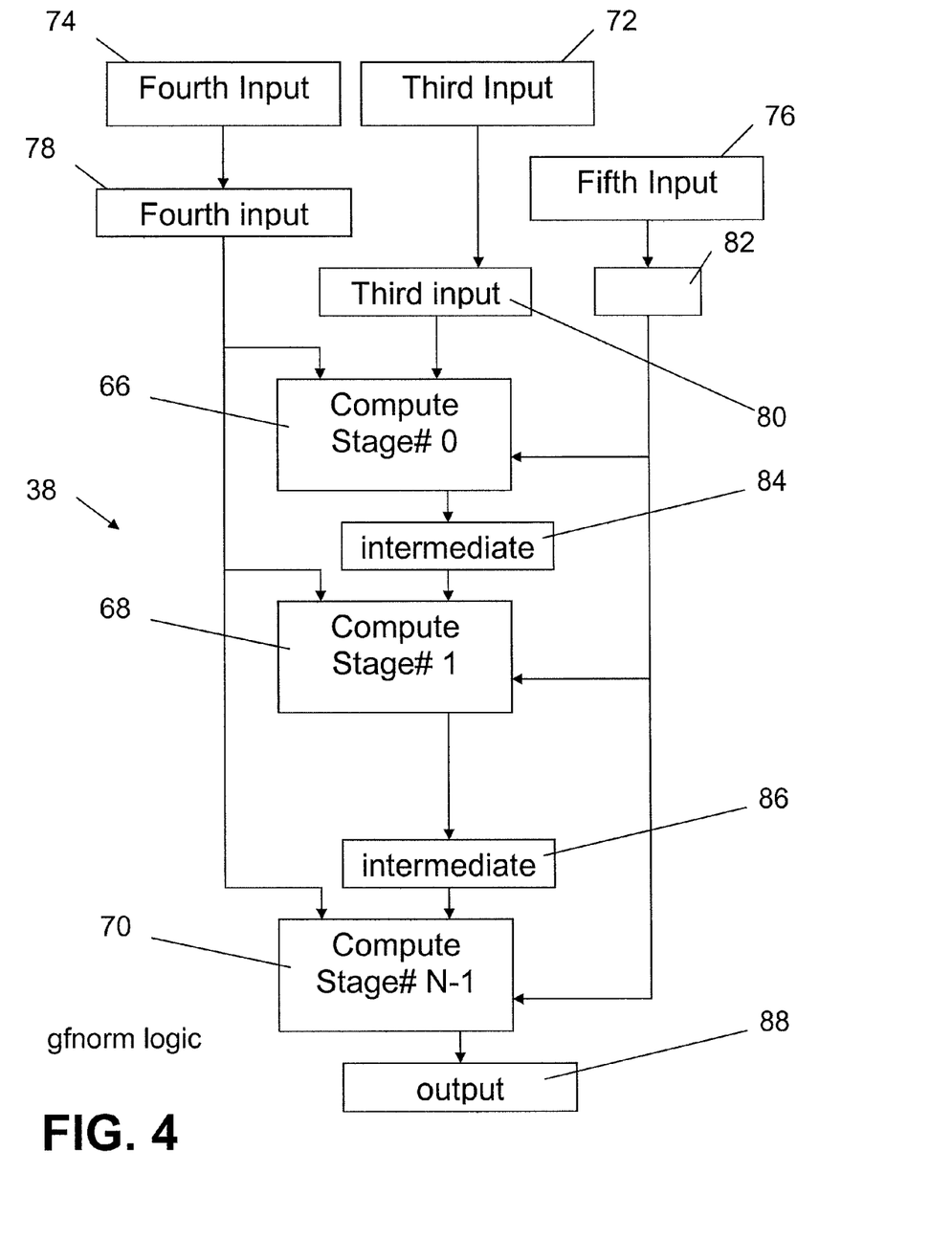
FIG. 4 is a block diagram providing one contemplated logic for the gfnorm instruction.

Referring to FIG. 3 and FIG. 4, the invention also encompasses hardware blocks 36 and 38, respectively. The hardware block 36 illustrates one contemplated embodiment for the gfmul logic. The hardware block 38 provides one contemplated embodiment for the gfnorm logic. These two embodiments are intended to be merely illustrative of two of the many hardware blocks 36, 38 contemplated to fall within the scope of this disclosure.

As noted in FIG. 3, the hardware block 36 includes N compute stage blocks, 48, 50, and 52. Each of these compute stage blocks 48, 50, 52 reads an intermediate value produced by a previous compute stage block and writes the intermediate value for consumption by the next compute stage block. The values consumed by the compute stage blocks are indicated by 46, 54, 56 and 58 in the figure. Value 58 is the output of the hardware block 36. Each of the compute stage blocks 48, 50, 52 reads an addend value 40 and length value 44. The hardware block 36 is intended to be a processor, such as a semiconductor component, that is configured to execute specific instructions with or without additional software instructions. As should be appreciated by those skilled in the art, this may encompass a wide variety of devices.

With continued reference to FIG. 3, this figure indicates how the block is connected to implement the gmful logic. It includes a first input 40 and a second input 42. The first input 40 is a component or a connection that receives signals including a first variable, which may be a multiplicand) variable. The second input 42 may be a component or a connection that receives a second variable, such as a multiplicand2 variable.

As illustrated in FIG. 3, an addend value 44 is set to the first input value 40 prepended by N zeroes. The addend value 44 is provided to the first compute stage block 48, the second compute stage block 50, and the third compute stage block 52. In addition, an intermediate value 46 is provided to the first compute stage block 48. The intermediate value 46 is set to 0 in this illustration. It is noted that the intermediate value 46 may be set to a value other than 0, as required by the hardware block 36.

As is apparent from FIG. 3, each compute stage 48, 50, 52 reads at least one bit of the second input 38. In other words, the second input 38 provides data to each of the compute stages 48, 50, 52. A length value 44 is set to N, which is equivalent to the number of compute stages. As noted in FIG. 3, the computer stages are numbered from 0 . . . N−1. The i-th stage will read the i-th bit starting at the most-significant bit. Thus, compute stage#0, 48, reads MSB bit 60, compute stage#1, 50, reads the next-to-MSB-bit, 62, and the last stage, 52, reads the Nth most significant bit, 64.

Reference is now made to FIG. 4, which diagrams the hardware block 38 for the gfnorm logic. As is immediately apparent, there are several similarities between the hardware block 38 and the hardware block 36 illustrated in FIG. 3.

In FIG. 4, the compute stages are numbered 66, 68, 70. The gfnorm logic block 38 includes a third input 72, which holds the dividend (generally the product of a gfmul), a fourth input 74, which is a divisor (generally the generator polynomial), and fifth input, 76, which is the number of steps, generally two less than the length, of the generator polynomial. An addend value 78 is copied from the fourth input 74. An initial intermediate value 80 is copied from the third input. A length value 82 is copied from the fifth input 76. As also shown, an intermediate value 84 is input into compute stage #1, 68. Similarly, an intermediate value 86 is inputted into compute stage #N−1, 70. The output is designated with the reference number 88.

Figure 5:
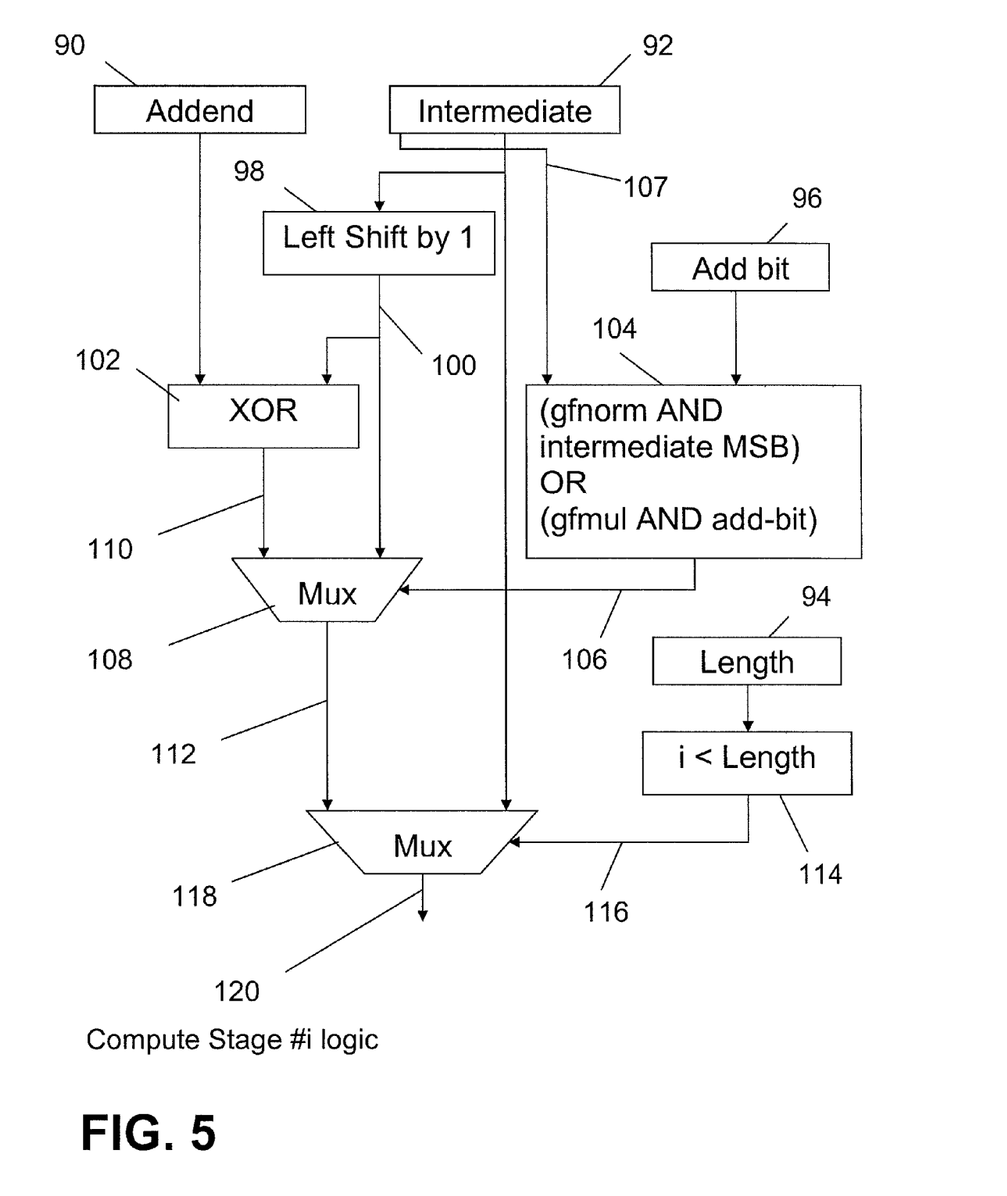
FIG. 5 is a block diagram providing one contemplated arrangement for a compute stage logic.

FIG. 5 provides a detail of one contemplated embodiment for the compute stage blocks 48, 50, 52, 66, 68, 70. As shown in FIGS. 3 and 4, each compute stage block 48, 50, 52, 66, 68, 70 reads an addend 90, an intermediate value 92, and a length 94. Additionally, when configured for gfmul, the compute stage block reads an add-bit 96. The intermediate value is left-shifted by 1 in hardware block 98, resulting in value shifted value 100. This value is then fed to XOR block 102 which XORs the shifted value 102 with the addend 90. A leading sign logic unit 104 generates a first select value 106. When configured for a gfnorm instruction, the first select value 106 is the MSB 107 of the intermediate input 92. When configured for a gfmul instruction, the first select value 106 is the add-bit 96. If first select value 106 is 1, the first multiplexer 108 selects the XOR-result 110 of the XOR. Otherwise, the first multiplexer 108 selects the shiftedvalue 100, generating a first mux result 112. A length compare logic 114 generates a second select value 116. The second select value 116 is 1 for the i-th compute stage if i is less than the provided length 94. The second select mux 118 selects the first mux result 112 if the second select value 116 is 1, otherwise it selects the intermediate value 92, producing the output intermediate value 120. Other variations also are contemplated, as should be appreciated by those skilled in the art.

As should be apparent from the foregoing, it is contemplated that the hardware blocks described in FIGS. 3, 4 and 5 may be replicated for parallel processing. If so, these replicas are contemplated to be operate in parallel with one another. With respect to this embodiment, any one of the hardware blocks may include a summation logic to sum results from individual ones of the parallel gfmul logics to produce a summed result. A scalar register may be used to store the summed result. The scalar register may be an accumulator. The parallel processing may be performed via a SIMD processor.

As noted above, the invention is not intended to be limited solely to the specific embodiments discussed above. To the contrary, those skilled in the art should readily recognize that there are numerous equivalents and variations to the embodiments that may be employed without departing from the scope of the invention. Those variations and equivalents are intended to fall within the scope of the invention.

What is claimed is:

1. A processor configured to perform a galois field multiply, comprising:
   a first circuit configured to execute a first instruction comprising:
     a first input configured to receive a plurality of coefficients of a polynomial that is a member of a galois field,
     a second input configured to receive a plurality of coefficients of a polynomial that is a member of the galois field, and
     a polynomial multiplier circuit configured to output a product by multiplying the first and second inputs;
   a second circuit configured to execute a second instruction comprising:
     a third input configured to receive a plurality of coefficients of a polynomial,
     a fourth input configured to receive a plurality of coefficients representing a predetermined generator polynomial of the galois field,
     a fifth input configured to receive a length of the predetermined generator polynomial, and
     a modulo computation circuit configured to output a modulus of the third input with respect to a divisor, wherein the modulus is generated by performing number of operations on the third input using the fourth input, wherein the number of operations is limited by the fifth input; and
   a stage computation circuit configured to be used by both the polynomial multiplier circuit and the modulo computation circuit, comprising a plurality of stages, the stage computation circuit further comprising:
     a sixth input configured to receive an intermediate value, and
     a seventh input configured to receive an addend value,
     wherein an exclusive OR operation is performed on the intermediate value and the addend value to produce an exclusive OR result,
     wherein the exclusive OR result is left-shifted to produce an output intermediate value, and
     wherein the output intermediate value is provided as an input to a next stage.

2. The processor of claim 1, further comprising:
a first select circuit configured to set the intermediate input value of a first stage to zero if the processor is executing the first instruction, or to the third input if executing the second instruction.

3. The processor of claim 2, further comprising:
a multiply bit circuit in each stage configured to determine if the bit corresponding to a number indicating the current stage of the second input, counted from the leading bit, is one
wherein if the processor is executing the first instruction, the stage computation circuit is configured to perform an exclusive OR operation on the addend and intermediate value.

4. The processor of claim 1, further comprising:
a second select circuit configured to set the value of the addend to the first input prepended with zeros corresponding to a number indicating the current stage if the processor is executing the first instruction, or to the fourth input if the processor is executing the second instruction.

5. The processor of claim 1, further comprising:
a leading bit circuit in each stage configured to determine if a leading bit of a current intermediate input of the stage equals one, and
if the stage number is less than the fifth input, and if the processor is executing the second instruction, the stage computation circuit is configured to perform an exclusive OR operation on the addend and the intermediate value.

6. The processor of claim 1, further comprising:
a shift circuit in each stage configured to determine if the stage number is less than the fifth input,
wherein if the processor is executing the second instruction, the stage computation circuit is configured to shift the exclusive OR result.

7. The processor of claim 1, further comprising:
a multiply shift circuit in each stage configured to shift the exclusive OR result when the processor is executing the first instruction.

* * * * *